United States Patent [19]
O'Neill et al.

[11] 3,790,951
[45] Feb. 5, 1974

[54] APPARATUS FOR MEASURING AND RECORDING ACCELERATION FORCES

[75] Inventors: Richard J. O'Neill; Gene M. Blaker, both of Champaign; Edward C. Manthei; Elmer L. Ronk, both of Mahomet, all of Ill.

[73] Assignee: Impact Registers, Inc., Champaign, Ill.

[22] Filed: Feb. 17, 1971

[21] Appl. No.: 116,151

[52] U.S. Cl.............. 346/7, 73/514, 346/49, 346/136 C
[51] Int. Cl. .............................................. G01d 9/10
[58] Field of Search.... 73/489, 514; 346/7, 49, 136; 116/129 A

[56] References Cited
UNITED STATES PATENTS

| | | | |
|---|---|---|---|
| 2,578,803 | 12/1951 | Holmberg et al. | 346/7 |
| 3,247,724 | 4/1966 | Powell | 73/519 |
| 2,775,502 | 12/1956 | Sykora | 346/49 |
| 2,659,232 | 11/1953 | Lubahn | 346/49 |
| 3,059,181 | 10/1962 | Benbow et al. | 324/154 |

*Primary Examiner*—Herbert Goldstein
*Attorney, Agent, or Firm*—Fitch, Even, Tabin & Luedeka

[57] ABSTRACT

A compact apparatus for measuring and recording acceleration forces by measuring three mutually perpendicular components and recording the components on a recording chart by means of three independent stylii. The stylii are mounted so that one stylus is displaced longitudinally on the chart with respect to the other stylii to permit lateral overlapping of the tracks of the three stylii resulting in a narrower recording chart and a more compact instrument. The mass affiliated with each stylus is rotatably mounted at its center of mass for increased accuracy and a novel spring mounting on the stylus arms results in an improved accuracy and frequency response.

9 Claims, 6 Drawing Figures

INVENTORS
RICHARD J. O'NEILL
GENE M. BLAKER
EDWARD C. MANTHEI
ELMER L. RONK

Anderson, Luedeka, Fitch, Even & Tabin
ATTYS.

INVENTORS
RICHARD J. O'NEILL
GENE M. BLAKER
EDWARD C. MANTHEI
ELMER L. RONK

INVENTORS
RICHARD J. O'NEILL
GENE M. BLAKER
EDWARD C. MANTHEI
ELMER L. RONK

ATTYS

APPARATUS FOR MEASURING AND RECORDING ACCELERATION FORCES

The present invention relates to apparatus for sensing acceleration loads, more particularly it is directed to an apparatus for accurately sensing and recording acceleration force components in three mutually perpendicular directions on a compact recording chart.

Apparatus for measuring acceleration forces are commonly used today in many fields particularly in the shipping and material handling fields. The typical recorder includes a paper recording chart which is advanced at a slow rate from a feed roll to a take-up roll by a spring wound or battery powered mechanism. One or more and usually three stylus arms are mounted for rotation adjacent the recording chart and each carries a stylus point in contact with the recorder chart to record a track for one force component. The stylus points are normally positioned next to each other laterally across the recording chart and the sweep of the stylus arms is limited so that the spans of the three recording tracks do not overlap during the operation of the device.

Each one of the stylus assemblies typically includes a weight eccentrically mounted with respect to the axis of rotation of the stylus arm in order to record a force component in one of three mutually perpendicularly directions. If a package being shipped is dropped or otherwise roughly handled, the recording chart will provide an accurate time log of the incident and will provide data regarding the harshness of the impact and of the direction in which the forces were applied to the package.

Because of the severe handling to which the recording apparatus might be subjected, one of the primary requirements for such an apparatus is that it be durable. Also, since it becomes part of a package being shipped it should be both light in weight and compact. Finally, because the data recorded may prove to be valuable in determining how damage to a package occurs, the results plotted on the chart should accurately reflect the forces to which the recorder is subjected during the time span in question.

The apparatus of the present invention, by means of a novel mounting and location of the stylus arms, the masses and the novel spring means for returning the stylii to their respective zero-lines on the chart, results in a device of improved accuracy, improved frequency response, and more compact construction than prior art recorders. At the same time, the apparatus of the present invention is sufficiently rugged and is adjustable to withstand high acceleration or G forces.

It is an object of the present invention to provide an improved apparatus for the measuring and recording of acceleration forces.

It is a further object of the present invention to provide an apparatus for more accurately measuring and recording acceleration forces than prior art apparatus.

Still another object of the present invention is to provide a compact apparatus for the recording of acceleration forces.

These and other objects of the present invention will become evident in connection with the following detailed description in conjunction with the drawings in which.

Figure 1:
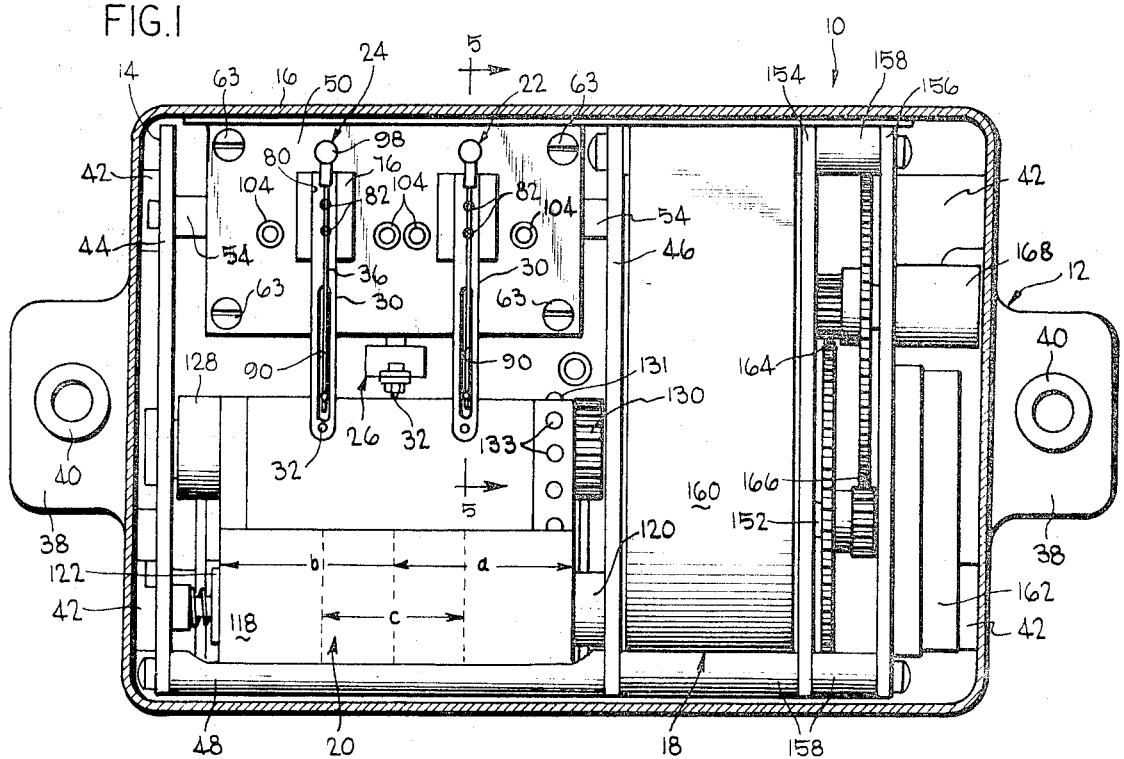
FIG. 1 is a plan view of one embodiment of the present invention with the cover plate in cross-section.

The measuring and recording apparatus 10 shown in the drawings to illustrate the present invention includes a base 12, a frame 14 attached to the base and a cover plate 16 overlying the frame. The mechanism within the frame includes a drive assembly 18, a recording chart 20 driven by the drive assembly, and three stylus assemblies. Each of the three stylus assemblies measures a different one of three mutually perpendicular force components. They will be designated hereinafter as the longitudinal assembly 22, the lateral assembly 24 and the vertical assembly 26. Each of the assemblies is similar in construction and includes a stylus arm pivot 28 (FIG. 4) mounted in the frame for movement about a first axis, carrying a stylus arm 30 which in turn carries a stylus 32 in pressurized contact with the recording chart 20. A mass 34 is eccentrically mounted on each stylus arm pivot 28 in a manner which permits free rotation of the mass about a second axis spaced from and parallel to the first axis of the stylus arm pivot.

Each stylus arm is maintained and returned to its central or zero-line position by a G spring 36 attached to the frame 14 and to the stylus arm 30. When the recorder is moved or dropped sharply in a given direction one or more of the stylus arm assemblies 22, 24, and 26 is caused to move from its zero-line position due to the eccentric mounting of the mass 34 with respect to the first axis of the stylus arm pivot referred to above. The stylus arm is returned to the zero-line position after impact by the flexed G spring 36 attached to the respective stylus arm assembly.

The horizontal base 12 of the apparatus is, as illustrated in FIG. 1, generally of rectangular configuration and is provided with two lugs 38 for mounting the apparatus in the location in which it is to be used. Each lug is provided with an open collar 40 for receiving a bolt or other means for mounting the apparatus in the desired location. The base 12 is made of metal or other suitable material and is of sufficient thickness to lend rigidity to the entire assembly. It is further provided with a series of bosses 42 along its perimeter and slightly set back therefrom to provide positioning surfaces for the location of the cover plate 16 when it is placed over the remainder of the apparatus. The cover plate 16, a rectangular boxlike structure, is made of thin metal and is removably affixed atop the base 12 by means of a thumb screw 43 threaded into a stem 45 upstanding rigidly from the base. The coverplate provides a dust free protective shield for the working parts of the apparatus.

Figure 3:
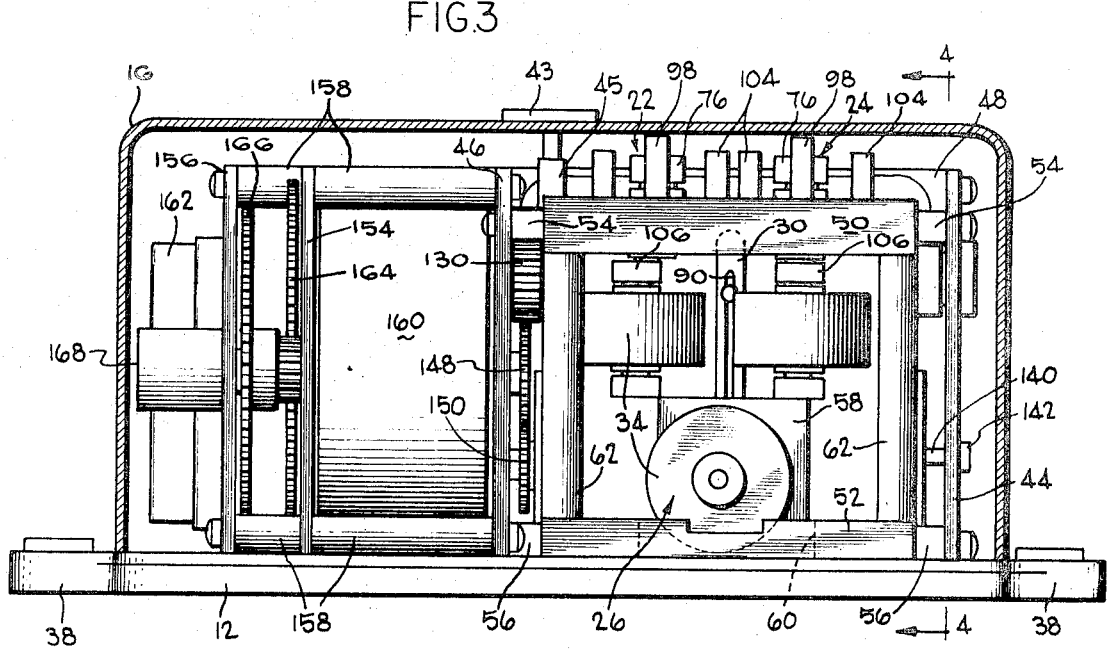
FIG. 3 is a rear elevational view of the apparatus of FIG. 1 with the cover plate in cross-section.

The frame 14 is made up of a series of interconnected plates and rods which support the movable portions of the apparatus. The frame is attached to the base 12 by screws and clips, not shown. In the illustrated embodiment the frame includes an end plate 44 and an intermediate plate 46 each made of metal and having a rectangular profile. The plates 44 and 46 are vertically disposed parallel to each other on the base 12 and are maintained in a spaced parallel relationship by several elements including horizontal support rods 48 and 49 extending perpendicularly between the plates 44 and 46 at the front upper and lower corners and suitably affixed by screws extending through openings in the respective plates. The remaining support is provided at the back side of the apparatus (upper portion of FIG. 1) by a pair of sensing support plates 50 and 52 (also shown in FIGS. 3 and 4), each extending horizontally between the plates 44 and 46. Both sensing support plates are made of heavy gauge metal and are rectangular in shape. The top plate 50 is formed with a series of openings which carry the longitudinal and lateral stylus arm assemblies 22 and 24 and the mounts for their respective G springs 36 mentioned earlier. The long dimension of the top sensing support plate 50 is somewhat smaller than the spacing between the two frame plates 44 and 46 and there are small cylindrical spacers 54 at each end extending in opposite directions so that the support plate and the spacers span the two frame plates. Mounting of the support plate 50 on the frame plates 44 and 46 is effected by means of screws extending through the plates and the cylindrical spacers 54 at either end of the support plate. The bottom sensing support plate 52 (FIGS. 3 and 4) parallels the top sensing plate 50 and lies on the base 12 of the apparatus between the two frame plates 44 and 46. It similarly has a pair of cylindrical spacers 56 at either end which extend to the frame plates and are secured thereto by screws. The bottom sensing support plate 52 is formed with a heavy lug 58 projecting vertically from its surface at the edge closest to the front of the apparatus. This upstanding lug which is rigidly affixed and can be intergally formed with the bottom support plate provides the mounting for the vertical stylus arm assembly 26 mentioned earlier. The bottom support plate 52 further includes a large rectangular opening 60 adjacent to the upstanding lug to provide clearance for the mounting of the vertical mass 34 which will be described hereinafter.

In order to stabilize the top and bottom sensing support plates 50 and 52, four hollow cylindrical corner posts 62 extend vertically between the two plates at their respective corners and are affixed thereto by screws 63 extending through the posts and openings in the corners of the top plate and threaded into the corners of the bottom plate.

Figure 5:
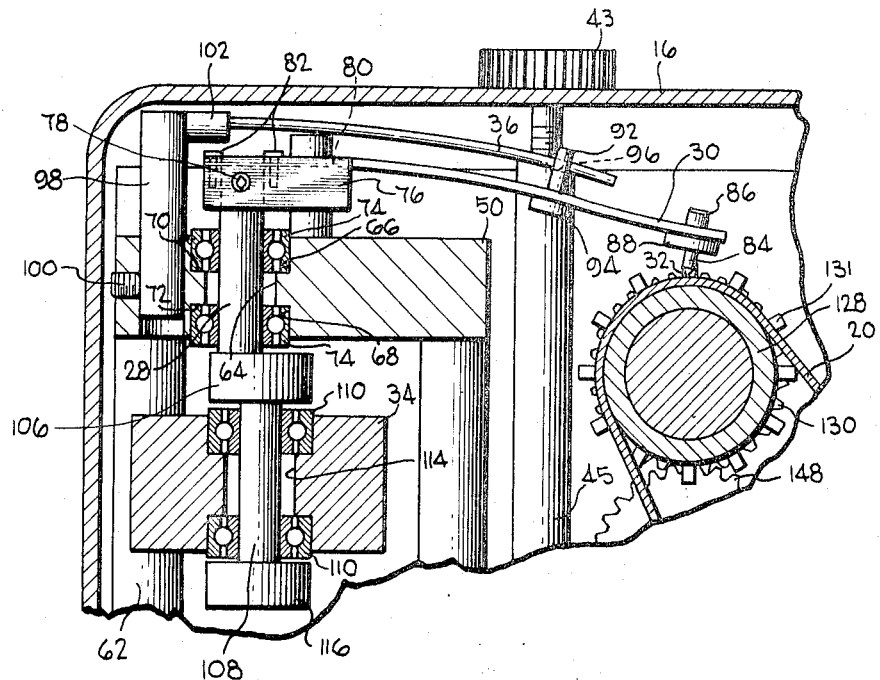
FIG. 5 is a cross-sectional view of a portion of an apparatus embodying the present invention taken along lines 5—5 of FIG. 1.

As mentioned earlier each of the stylus arm assemblies 22, 24, and 26 measures force in a different direction perpendicular to that of each of the other two assemblies. Referring specifically to FIG. 5, it can be seen that the longitudinal stylus arm assembly is received in a stepped circular vertical opening in the top sensing support 50. The opening includes a central portion 64 of a smaller diameter and larger diameter end portions 66 and 68 terminating in shoulders 70 and 72 which act as seats for a pair of bearing assemblies 74 at the top and bottom of the support plate 50. The outer race of each bearing assembly sits on the respective shoulder and is suitably secured in place. The inner race of each bearing assembly is affixed to the vertically disposed stylus arm pivot 28 extending beyond the bearings both above and below the upper sensing support 50 and adapted for rotation about a fixed first axis which is the axis of the stylus arm assembly 22. A stylus arm mounting bracket 76 rectangular in form is affixed to the upper end of the pivot rod by suitable means such as a set screw 78 so that it rotates with the pivot rod 28.

The upper surface of the stylus arm mounting bracket 76 includes a shallow channel portion 80 adapted to receive the stylus arm and a pair of threaded openings for receiving two screws 82 for mounting the stylus arm. The stylus arm 30 is a flat elongated strip of thin spring steel symmetrical about a plane through its longitudinal centerline, and is affixed cantilever fashion at one end to the stylus arm mounting bracket by means of the two screws which hold it securely within the channel 80 on the top of the mounting bracket so that it pivots with the bracket 76. The stylus arm extends horizontally from the mounting bracket and to the right as viewed in FIG. 4 with its free end portion directly over a portion of the recording chart 20 which will be described in detail hereinafter. At the edge of the mounting bracket 76, the stylus arm is bent slightly in a downward direction to cause a spring loading of the stylus 32 toward and into engagement with the surface of the recording chart.

The outer end of each stylus arm 30 carries the stylus 32 which may be simply a pointed end of a bolt 84 threaded into a collar 88 on the underside of the end of the stylus arm and having an enlarged head 86 engaging the upper side of the arm. This type of stylus is preferred to an ink carrying or other type marking stylus because when used in conjunction with a pressure sensitive recording chart there is no danger of running out of ink or writing fluid during the course of shipment when there is no operator to correct the situation.

Extending throughout a major portion of the length of the stylus arm 30 between the mounting bracket 76 and the stylus 32 is a slot 90 which serves the dual functions of reducing the mass of the stylus arm for better response and of providing a place for mounting an adjustable G spring retainer 92. The latter is a small metal stub which extends upwardly through the slot in the stylus arm from an enlarged head 94 (FIG. 5) which is secured as by solder in a preselected position along the underside of the stylus arm. The retainer 92 is formed with a small diameter opening 96 which extends laterally through the stub and extends longitudinally of the centerline of the stylus arm.

The G spring 36 is mounted cantilever fashion parallel to the centerline of the stylus arm 30 by an adjustable vertical post 98 which extends into an opening in the upper sensing support plate 50 and is held therein by a horizontally disposed set screw 100 threaded into the edge of the support plate into contact with the post. Secured to the upper end of the spring mounting post is a horizontally disposed cylindrical spring holder 102 which receives and is secured as by soldering to the end of the G spring 36. The set screw permits the rotational position of the post and the fixed end of the spring 36 to be adjusted so that the spring extends horizontally in parallel with the centerline of the stylus arm 30 when the arm is in its zero position. The G spring itself is made of spring wire such as piano wire of desired diameter and its free end is inserted in sliding relationship through the opening 96 in the adjustable G spring retainer 92 on the stylus arm.

As can be seen from FIG. 5, the disposition of the G spring is not entirely horizontal between the spring mounting post 98 and the spring retainer 92 but is slightly flexed from a horizontal fixed position of the end portion in the spring holder 102 downwardly through the opening 96 in the spring retainer. This flexure results in a upward pressure which in part counteracts the downward pressure in the stylus caused by the bend in the stylus arm referred to above. The result of the counteracting pressure is a uniform stylus pressure for all conditions of operation.

As the spring mounting post 98 is secured to the upper mounting plate 50 by the set screw 100, it is possible to adjust the zero position of the spring and consequently the zero-line of the stylus by loosening the set screw and rotating the post 98 in relation to the support plate. This capability provides one of the advantages of the present invention since the adjustment can be made and repeated at any time or the spring post or holder can be removed and a spring having a different spring constant substituted therefor resulting in either a higher or lower load requirement for full scale deflection of the stylus arm. In the unflexed position of the spring, the axes of the mounting post 98 and the stylus arm pivot 28 are aligned with the centerline of the stylus arm. With the spring mounting post affixed to the support plate 50, a deflection of the stylus arm to either side of the zero-line produces a flexure of the G spring 36 and, when the force is removed, there is a consequent unflexing of the spring and a return to the zero-line. Because the mass of the stylus arm is concentrated primarily in the stylus arm mounting bracket 76 at the stylus arm pivot 28, the stylus arm has extremely high frequency response and can record repeated loads such as vibrational loads with great accuracy.

The lateral range of the stylus arm movement is limited so that the stylus arms which are mounted side by side will not interfere with each other during operation of the apparatus. The limitation of movement or the width of the track of each stylus to full scale is established by a pair of vertically disposed stops 104 positioned on either side of the stylus arm mounting bracket toward its outer end and away from the axis of the stylus arm pivot 28. Movement of the stylus arm to one side or the other results in the engagement of the side of the stylus arm mounting bracket 76 against one or the other of the stops 104 limiting the movement of the stylus itself approximately to the center and to the outer edge of the recording chart. For the longitudinal assembly 22 this track is designated "a" in FIG. 1.

It should be understood that each of the three stylus arm assemblies 22, 24 and 26 are of similar construction. The lateral and longitudinal assemblies 22 and 24 are positioned and held in the top sensing support plate 50 while the vertical assembly 26 is mounted on the upstanding lug 58 of the bottom sensing support plate 52 and is positioned directly between the longitudinal and lateral assemblies with its centerline on the center of the recording chart.

Figure 4:
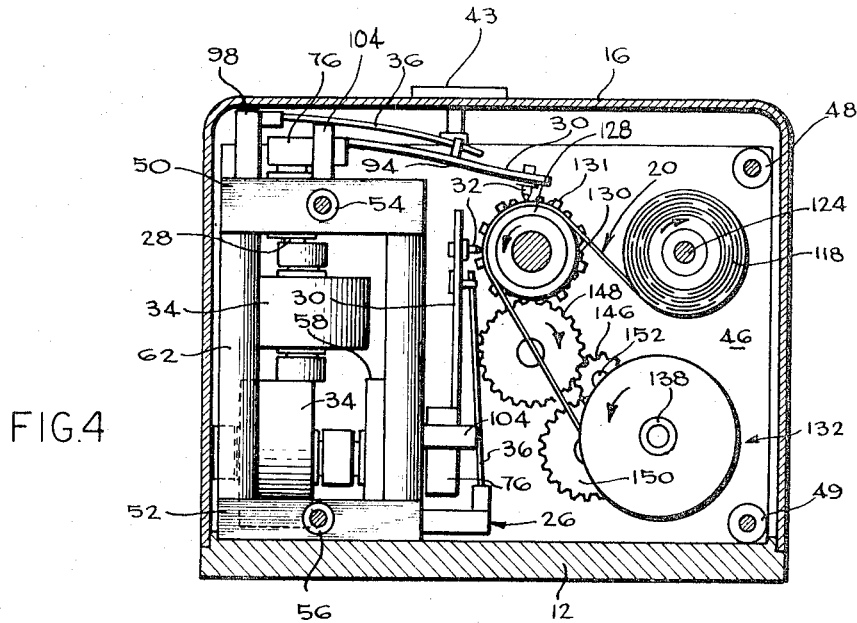
FIG. 4 is a sectional view of one embodiment of the present invention taken along lines 4—4 of FIG. 3.

As can be seen from FIGS. 1 and 4, the stylus on the vertical assembly 26 is inverted and the stylus arm is biased in the opposite direction (e.g., toward the spring) when compared to the other assemblies. In all other respects the vertical assembly is identical with the other assemblies. Because the vertical assembly 26 is positioned on the upstanding lug 58 the zero position of the stylus arm is vertical with respect to the base of the entire assembly and the track "c" of the vertical stylus is centered at the edge of the two tracks "a" and "b" of the longitudinal and lateral stylii overlapping into one-half of each of the longitudinal and lateral tracks without interferring with the movement of either of the other stylus arms. The result of this construction with the vertical assembly angularly spaced around the chart from the other assemblies is a saving of one-third of the width of the recording chart utilized in prior art apparatus for recording of the three individual force components by three stylus assemblies mounted side by side. The novel mounting can provide two options by permitting expansion of the track of each of the three stylus arm assemblies resulting in a higher degree of precision in the recording or by maintaining the same width of track as in the typical prior art apparatus and making the apparatus of the present invention more compact than any previously available apparatus.

The actual forces measured by the apparatus of the present invention are primarily impact forces caused by the shaking or dropping of the apparatus or the object to which it is attached. In order to accurately measure these forces and record them by the deflection of the respective stylus arms it is necessary that a weight or mass having a predetermined value be mounted eccentrically with respect to the axis of the stylus arm pivot 28. The eccentric mounting in the present application is effected by means of an eccentric multiplier 106 (FIGS. 3 and 5) which is affixed at one point to the lower end of the stylus arm pivot 28 and at another point to a vertically disposed downwardly depending shaft 108 which has an axis spaced from and parallel to the stylus arm pivot.

The eccentric multipliers 106 of the present apparatus are circular discs of metal each having an opening receiving one stylus arm pivot 28 near the periphery and an opening receiving the mass carrying shaft 108 centrally located with respect to the circular profile of the eccentric (FIG. 5). The offset of the eccentric is, in each of the three cases, in a direction from the stylus arm pivot which is perpendicular to the force component to be measured by that particular stylus arm assembly.

The downwardly depending shaft 108 serves as a mounting means for the predetermined mass 34 which, in accordance with the invention, is rotatable. In each case, the mass 34 is mounted on upper and lower bearings 110 (FIG. 5) having their inner races fast on the shaft and their outer races secured to the mass. The mass 34 is, in the illustrated embodiment, a cylindrical metal body having a central opening 114 receiving the outer race of the bearings and an outer diameter compatible with the range of movement of the eccentric 106 so that the three weights will not interfere with each other. At the lower end of the vertically disposed shaft 108 a collar 116 is affixed by means of a set screw to maintain the entire assembly of the mass on the vertical shaft.

It should be understood with respect to the vertical stylus arm assembly 26 that all of the above description is inverted 90° and the shaft extends horizontally with respect to the base and is offset horizontally with respect to the stylus arm pivot. The vertical mass 34 is located partially within the rectangular opening 60 in the bottom sensing support plate 52 described earlier (FIG. 3), is offset laterally with respect to the vertical stylus arm pivot and moves in a vertical direction in response to a vertical acceleration force.

The particular advantage of mounting the weights in this manner so that they are free to rotate and have their centers of mass and percussion at the centerline of the respective shafts upon which they are mounted results in the ability to use a smaller mass than was possible in prior art apparatus due to the fact that the entire mass is employed actively in sensing the acceleration forces. In prior art devices the masses were rigidly mounted, in pendulum or other fashion, eccentric to the stylus arm pivots so that a force moving the eccentric and the stylus arm was partially absorbed in a turning motion of the mass as well as a lateral movement of the mass. The result in the prior art apparatus was that the masses employed were effectively one-half of the actual mass attached to the eccentric. In addition, rotational momentum of the prior art masses had to be reversed to return the stylus to the zero-line resulting in inferior frequency response. As a result of the present mounting, a more accurate force reading can be obtained with a much smaller mass resulting in a more compact and reliable apparatus.

The foregoing description covers the entire sensing portion of the present apparatus. The remainder of the apparatus relates to the recording chart 20 and the mounting and driving means therefor. The recording chart is driven at a constant rate by the drive assembly 18 and passes from a horizontal supply roll 118 to a receiving roll 132 and around a backing roll 128 (FIG. 4). All of the rolls are mounted on the two plates 44 and 46 for rotation about parallel horizontal axes. The supply roll is located at the upper front of the apparatus and has a supply roll retainer 120 mounted on the intermediate plate 46 (FIG. 1) and having a circular shoulder for receiving a tubular end of the supply roll which is usually made of cardboard. A second supply roll retainer 122 is provided at the opposite end of the supply roll also including a circular shoulder for insertion into the tube containing the supply roll and a stem 124 slidably received in an opening provided in the end plate 44 so that the retainer 122 can be withdrawn from the roll to permit removal of the old roll and insertion of the new supply roll. When the retainer is not withdrawn it is urged into contact with the end of the roll by means of a coil spring 126 which is compressed between the wall behind the shoulder and the end wall 44 in surrounding relationship to the stem 124. There is no drive means associated with the supply roll and tension in the recording chart as it is pulled from the supply roll is maintained by friction due to the spring loading on the second supply roll retainer 122.

From the supply roll 118, the recording chart 20 moves back toward the sensing portion of the apparatus and around the horizontal backing roll 128. This roll is rotatably mounted on and between the plates 44 and 46 and its surface is so positioned that the lateral and longitudinal stylii 32 are directly above its axis of rotation in a vertical plane and engage the recording chart in a vertical direction while the vertical stylus is disposed between the other two stylii and engages the recording chart in the horizontal centerline plane of the backing roll. Thus the engagement of the vertical stylus is one-quarter turn or 90° advanced from the points of contact of the other two stylii resulting in a spacial lead of one-quarter turn of the backing roll for the vertical trace corresponding to the same point in time as the longitudinal and lateral traces. It is this relationship, which permits the respective tracks to overlap.

The backing roll 128 is rotatably mounted at opposite ends on the end plate 44 and the intermediate plate 46 and, adjacent the latter, carries a drive roll spur gear 130 connected to the drive assembly 18. Projecting outwardly from the backing roll adjacent its spur gear are a series of actuating pins 131 uniformly spaced circumferentially around the roll to register with perforations 133 on the edge of the recording chart 20 resulting in a positive drive mechanism for the recording chart to pull it from the supply roll 118 and around the backing roll 128 at a constant speed.

Figure 2:
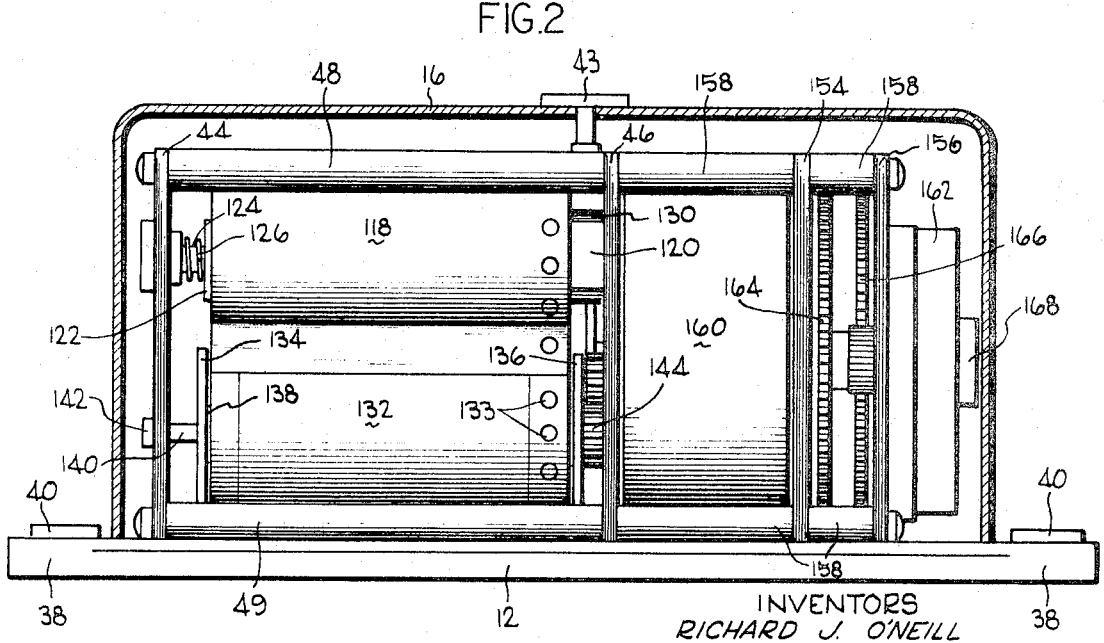
FIG. 2 is a front elevational view of the apparatus of FIG. 1 with the cover plate in cross-section.

From the backing roll 128, the chart 20 proceeds downwardly and forwardly toward the front of the apparatus to a receiving or take-up roll 132 (FIG. 4). The take-up roll has a horizontal axis parallel to the other rolls and includes a pair of large end flanges 134 and 136 (FIG. 2) and a central cylinder 138 upon which the used chart is wound after leaving the backing roll. The take-up roll is rotatably mounted at opposite ends on the end plate 44 and the intermediate plate 46. The mounting in the plate 44 is effected by means of a shaft 140 threaded into the central cylinder of the roll and receiving a nut 142 on the outer side of the plate so that the roll may be removed after the chart is completely used by first removing the nut and then removing the shaft. The mounting of the opposite end of the take-up roll on the intermediate plate 46 is effected by a stub shaft carrying a take-up spur gear 144 and a constant friction clutch (not shown). The spur gear is positioned just outside the flange of the take-up roll and the friction clutch, of any conventional design, is inserted within the hollow opening of the central cylinder 138 to provide a constant frictional contact with the inner surface of the cylinder.

Both the backing roll gear 130 and the take-up roll gear 144 are connected to the drive assembly of the apparatus by means of a gear train (FIG. 4) which includes a main drive gear 146 mounted on the intermediate plate 46 for rotation about a horizontal axis and a pair of idler gears 148 and 150 positioned on either side of the drive gear and meshing therewith. The idler gears in turn mesh with the backing roll gear 130 and the spur gear 144 of the take-up roll. The main drive gear 146 is mounted on a shaft 152 which extends through the intermediate plate 46 and is driven directly by the drive assembly 18. As viewed in FIG. 4, a counterclockwise movement of the main drive gear results in clockwise movement of each idler gear and counterclockwise movement of both the backing roll gear and the spur gear of the take-up roll.

The counterclockwise movement of the backing roll gear 130 creates a positive drive in conjunction with the actuating pins 131 to cause the recording chart 20 to be pulled from the supply roll 118 and over the backing roll 128. The counterclockwise movement of the spur gear 144 of the take-up roll 132 creates a constant frictional force through the clutch tending to cause the take-up roll to rotate in a counterclockwise direction. Since this frictional force is relatively small, the take-up roll will not cause a pulling or tearing of the recording chart but will merely take up the slack as the recording chart passes over the backing recording roll and becomes free thereof. In order to assure that this function of the take-up roll is accomplished, the spur gear 144 of the take-up roll is of smaller diameter than is the driving gear of the backing roll. Thus, the spur gear of the take-up roll rotates faster than the actual take up of the recording chart resulting in a constant slippage of the friction clutch.

In the illustrated embodiment, the drive assembly 18 for the apparatus is positioned outside the space between the plates 44 and 46 and is mounted on the intermediate plate 46 and an additional pair of vertical plates 154 and 156. The rigidity of the latter plates and the spacing therebetween is maintained by a series of cylindrical spacers 158 similar to the spacers 48 and 49 in registering with openings in the corners of the respective plates and threadably receiving mounting screws. The spacing between the inner plate 154 and the intermediate plate 46 is occupied by a coiled drive spring 160 which provides the power for the driving of the entire apparatus. The drive spring is anchored at its outer end to an upper frame supporting rod 158 and at the inner end (not shown) of its coil to the horizontal shaft 152 carrying the main drive gear 146 referred to earlier. The shaft 152 of the main drive gear extends through the spring and through both the plate 154 on the other side of the spring and the opposite end plate 156 of the drive assembly. The end plate 156 carries a clock governor 162 which may be any suitable commercially available clock governor, mounted on the outside of the plate and connected directly to the shaft 152 on which the main gear is mounted. The space between the two plates is occupied by two sets 164 and 166 of gears one of which connects a horizontal winding stem 168 to the main spring for winding the apparatus and the other of which connects the winding stem shaft to the governor.

Depending on the adjustment of the governor 162 and on the width and strength of the spring 160 the apparatus can be designed for use as an eight day clock up to a 33-day clock. When in operation, the drive assembly 18 drives the recording chart 20 at a constant rate established by the governor and a time related profile is recorded on the recording chart so that any dropping, vibrating or handling of the package can be time-related to the person or entity in charge of the package at the time of the incident.

The specific drive assembly 18 described herein does not form part of the present invention and other drive means could be employed. For example, it is also possible to substitute a battery driven assembly for the drive assembly illustrated herein or to substitute a drive assembly which actuates the chart only after a given impact and advances the chart only a short distance before stopping again until the next impact. The latter type of drive assembly could be utilized in situations where it was not important to record the time of the impact and results in a much lower usage and longer life of the recording chart.

Figure 6:
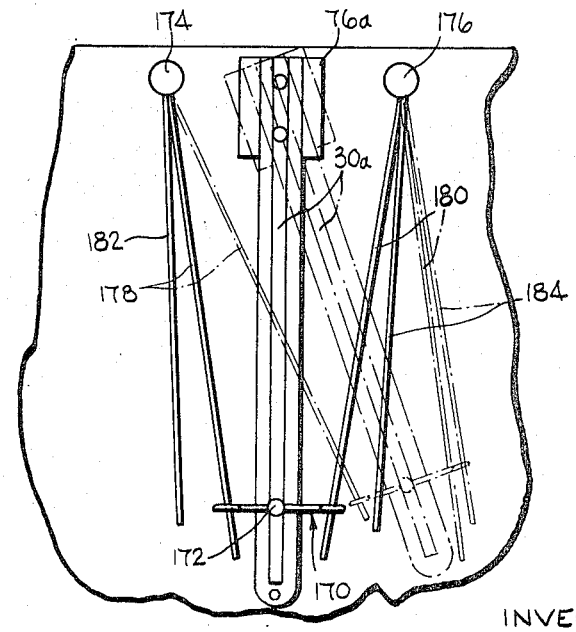
FIG. 6 is a fragmentary plan view of an alternate embodiment of a stylus arm assembly in accordance with the present invention.

The recording apparatus illustrated in FIGS. 1 through 5 provides a greatly improved frequency response due to the novel spring and stylus mountings and also improved accuracy due to the mounting of the masses, at the same time achieving more compactness than prior art apparatus. It will be evident, however, to one skilled in the art that any single spring mounting for the stylus arm does not provide any significant damping function with the exception of the frictional drag of the stylus point on the recovery chart itself. Furthermore, the single spring 36 of FIGS. 1 through 5 may produce a non-linear response to deflections in excess of 10° or rotation from the zero-line. FIG. 6 illustrates an alternative embodiment which can be employed in the present invention where damping and linearity of the spring action and improved frequency response is desired beyond that provided by the spring mounting described in connection with FIGS. 1 through 5.

In the embodiment of FIG. 6, a stylus arm 30a is mounted on a stylus arm bracket 76a similar to that shown in the previous figures. Near the outer end of the stylus arm an adjustable spring retaining yoke 170 is provided which consists of a pair of laterally disposed arms extending on either side of the stylus arm and a flanged base 172 affixed to the stylus arm at the desired distance from the stylus pivot by suitable means such as soldering. A small opening is provided near the extremity of each of the laterally disposed arms for receiving a G spring in sliding relationship. A pair of vertically disposed spring mounting posts 174, 176 similar to those employed in the other embodiment are mounted on either side of the stylus arm pivot and each carries a horizontally disposed primary G spring 178, 180 which extends in cantilever fashion from the spring mount and through the respective ones of the openings in the spring retaining yoke. Each of the G springs extends somewhat beyond the opening in the yoke for reasons which will become evident hereinafter. The spring mounting posts are disposed at equal distances on either side of the stylus arm pivot and are adjusted so as to orient the stylus arm along a desired zero-line in the no force situation.

When the stylus arm 30a is caused to move in either direction due to the application of a force, the spring retaining yoke 170 moves with the stylus arm and causes both of the G springs 178, 180 to flex simultaneously. At the same time, a sliding contact between the G springs and the openings at the end of the yoke result in a longer effective spring length for the spring on the side away from the stylus arm movement and a shorter effective spring length on the side closest to the direction of the stylus arm movement. As a result of this double spring arrangement, a damping factor is provided resulting in part from a lower flexure of the one spring relative to the other and in part from the sliding frictional contact of the springs with the openings of the yoke. Accordingly, the apparatus shown in FIG. 6 provides an improved damping function and frequency response over that of the first embodiment illustrated. In addition, secondary springs 182 and 184 are mounted on the respective spring mounting posts 174 and 176 and extends outwardly therefrom in a direction diverging from that of the corresponding primary spring which is retained in the spring retaining yoke 170. The horizontal disposition of the secondary springs is such that they are level with the spring retaining yoke in its position on the stylus arm.

When the secondary springs 182 and 184 are present and the stylus arm 30a is deflected in one direction or the other beyond a predetermined amount, the end of the yoke 170 in the direction of the stylus arm movement engages the secondary spring on that side resulting in a flexure of the secondary spring as well as the two primary springs. When the deflecting force is removed, the secondary spring initially assists in the returning of the stylus arm to the zero-line until it breaks contact with the end of the yoke after which the remainder of the distance is traversed by the unflexing of the two primary springs. If the deflection is sufficiently wide and the frequency of the force is sufficiently high, the assistance provided by the flexure of the secondary spring through only a portion of the swing of the stylus arm results in a still greater frequency response and damping factor for the entire apparatus. When the stylus arm is caused to swing in the opposite direction, the opposite secondary spring comes into play and assists in returning the stylus arm to the zero-line.

The location of the spring mounting posts 174 and 176 relative to the stylus arm mount 76a can be varied and will result in different primary and secondary spring action. In addition, for some applications, the secondary springs 182 and 184 might be eliminated and the two primary springs 178 and 180 utilized alone.

It should be understood that the spring retaining yoke 170 may be located on the stylus arm 30a in different positions thus providing an easy way to change the full scale G force while retaining the same set of springs in the apparatus. It is, of course, also possible to substitute different springs while leaving the spring retaining yoke in the same position for either set of springs.

The apparatus of the present invention is an improved impact recorder having several desirable features not present in prior art apparatus. The arrangement of the vertical stylus arm assembly 26 between and at right angles to the longitudinal and lateral stylus assemblies 22 and 24 results in a more com-pact device which takes up less room in a shipping package. The novel mounting means for the springs 36 results in an apparatus in which the zero-line of each stylus arm can be easily adjusted and in which the adjustable G spring retainer 92 on the stylus arm 30 can be located to vary the full scale G force while still employing the same spring. Finally, the two types of spring systems result in the provision of an apparatus which can be custom designed to the particular frequency response and camping quality desired for the particular application for which it is intended.

Although the present invention has been described herein with reference to specific embodiments, it will be understood that the details of construction may be altered without departing from the spirit of this invention, as defined by the following claims:

What is claimed is:

1. An apparatus for measuring and recording acceleration loads, said apparatus comprising a frame,
   a recording chart mounted on said frame and adapted to be advanced in a predetermined direction,
   a stylus arm rotatably mounted at one of its ends on said frame for movement throughout a fixed full range on either side of a zero-line, about a first axis, said stylus arm carrying a stylus at the end opposite the rotatable mounting in contact with said recording chart for recording acceleration components in a predetermined direction on said recording chart,
   a mass operatively connected to said mounting and having its center of mass spaced from said first axis,
   spring mounting means affixed to said frame and extending therefrom adjacent the rotatable mounting for said stylus arm,
   a spring affixed to said spring mounting means and extending in its unflexed state generally along the zero-line of said stylus arm,
   a spring retainer mounted on said stylus arm and having an opening slidably receiving said spring at a predetermined distance from said spring mounting means, said predetermined distance being selected to provide a preselected full range load and frequency response when said spring is flexed by rotational movement of the stylus arm about said first axis, said spring retainer being adjustable along said stylus arm to different positions whereby different values of the full range load and the frequency response may be selected using a single spring.

2. An apparatus for measuring and recording acceleration loads, said apparatus comprising a frame,
   a recording chart mounted on said frame and adapted to be advanced in a predetermined direction,
   a stylus arm rotatably mounted at one of its ends on said frame for movement throughout a fixed full range on either side of a zero-line, about a first axis, said stylus arm carrying a stylus at the end opposite the rotatable mounting in contact with said recording chart for recording acceleration components in a predetermined direction on said recording chart,
   a mass operatively connected to said mounting and having its center of mass spaced from said first axis,
   spring mounting means affixed to said frame and extending therefrom adjacent the rotatable mounting for said stylus arm,
   a spring affixed to said spring mounting means and extending in its unflexed state generally along the zero-line of said stylus arm,
   a spring retainer mounted on said stylus arm and having an opening slidably receiving said spring at a predetermined distance from said spring mounting means, said predetermined distance being selected to provide a preselected full range load and frequency response when said spring is flexed by rotational movement of the stylus arm about said first axis, said stylus are being slightly flexed to maintain the pressure of said stylus against said recording chart and said spring being slightly flexed between said spring mounting means and said spring retainer in the direction opposite the flexure of said stylus arm to partially counteract the pressure on said stylus and provide a uniform stylus pressure for all conditions of operation.

3. An apparatus as set forth in claim 2 wherein the position of said spring retainer is adapted to be adjusted along said stylus arm whereby the stylus pressure, the full range load and the frequency response can be varied while employing the same spring.

4. An apparatus for measuring and recording acceleration loads, said apparatus comprising a frame,
   a recording chart mounted on said frame and adapted to be advanced in a predetermined direction,
   a stylus arm rotatably mounted at one of its ends on said frame for movement throughout a fixed full range on either side of a zero-line, about a first axis, said stylus arm carrying a stylus at the end opposite the rotatable mounting in contact with said recording chart for recording acceleration components in a predetermined direction on said recording chart,
   a mass operatively connected to said rotatable mounting and having its center of mass spaced from said first axis,
   a pair of spring mounting means affixed to said frame and extending therefrom adjacent opposite sides of the rotatable mounting for said stylus arm,
   a pair of primary springs each affixed to one of said spring mounting means and extending in their unflexed state generally along either side of said stylus arm and said zero-line, spring retaining means mounted on said stylus arm and extending from both sides thereof, said spring retaining means having an opening near each of its ends, each of said openings slidably receiving one of said pair of primary springs, the position of said spring retaining means along said stylus arm being selected to provide a preselected full range load and frequency response when said primary springs are flexed by rotational movement of the stylus arm about said first axis.

5. An apparatus as set forth in claim 4 further comprising a pair of secondary springs mounted one on each of said spring mounting means and each extending in a common plane with and angularly disposed to said primary springs to a point adjacent and outside the ends of said spring retaining means so that rotational movement of said stylus arm in either direction will result in said spring retaining means engaging one of said secondary springs causing it to flex in cooperation with said primary springs whereby the frequency response and damping of the stylus arm is improved.

6. An apparatus for measuring acceleration forces comprising a stylus arm, pivot means mounting said stylus for rotational movement about a fixed axis, a predetermined mass mounted on said pivot means on an axis parallel to and spaced from said fixed axis to cause said pivot means and said stylus arm to rotate in response to accelerative forces, said mass being mounted at its center of mass for free rotation relative to said parallel axis to render all of said mass effective in measuring accelerative forces.

7. An apparatus as set forth in claim 6 wherein said pivot means is mounted on bearings for free rotation about said fixed axis, and wherein said mass is cylindrical and is mounted on bearing means along its central axis on said axis parallel to and spaced from said fixed axis.

8. An apparatus for recording force components in three mutually perpendicular directions on a movable recording chart, comprising, in combination, means responsive to inertia forces in three mutually perpendicular directions, chart support means including a roller over which said recording chart passes, means for effecting movement of said chart over said roller, three similar recording stylus assemblies operable by said means responsive to inertia forces to separately record the force components on a middle and two outer longitudinally extending tracks on said chart having parallel spaced zero-lines, each of said stylus assemblies including a stylus arm mounted for rotation about an axis generally perpendicular to the longitudinal axis of the associated arm to allow movement of the arm laterally of its corresponding zero-line over a range which extends on both sides of its corresponding zero-line, said stylus assemblies being positioned for association, respectively, with said middle and two outer tracks such that one stylus assembly comprises a middle stylus assembly having its arm movable over a range overlapping at least a portion of the range covered by the arm of each of the two outer stylus assemblies, said middle stylus being positioned angularly around said roller relative to the outer stylus assemblies such that the axis of rotation of said middle stylus arm lies in a plane intersecting a common plane defined by the rotational axes of the outer stylus arms such that the lateral range of said middle stylus arm is permitted to overlap the ranges of the adjacent outer stylus arms without interference between adjacent arms resulting in a more compact chart having one track at a fixed time differential from the remaining tracks.

9. An apparatus as set forth in claim 8 wherein said chart passes around said roller and said longitudinal positioning of said middle stylus is effected by positioning said middle stylus 90° of rotation on said roller from the remaining stylii.

* * * * *